(12) United States Patent
Aoyagi et al.

(10) Patent No.: US 9,162,619 B2
(45) Date of Patent: Oct. 20, 2015

(54) NOTIFICATION SOUND CONTROL UNIT OF APPROACHING VEHICLE AUDIBLE SYSTEM

(75) Inventors: Takahisa Aoyagi, Tokyo (JP); Asako Omote, Tokyo (JP); Youichi Kato, Tokyo (JP); Noritaka Kokido, Tokyo (JP); Satoru Inoue, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/371,676

(22) PCT Filed: Mar. 16, 2012

(86) PCT No.: PCT/JP2012/056830
§ 371 (c)(1),
(2), (4) Date: Jul. 10, 2014

(87) PCT Pub. No.: WO2013/136504
PCT Pub. Date: Sep. 19, 2013

(65) Prior Publication Data
US 2014/0375443 A1 Dec. 25, 2014

(51) Int. Cl.
 *B60Q 1/00* (2006.01)
 *B60Q 5/00* (2006.01)
 *G10K 15/02* (2006.01)

(52) U.S. Cl.
 CPC ............... *B60Q 5/008* (2013.01); *G10K 15/02* (2013.01)

(58) Field of Classification Search
 CPC .................. B60Q 5/008; G10K 15/02
 USPC .............. 340/425.5, 435, 438, 441, 903, 905; 701/36
 See application file for complete search history.

(56) References Cited

U.S. PATENT DOCUMENTS

| 5,635,903 | A  | * | 6/1997  | Koike et al. | 340/441 |
| 8,204,243 | B2 | * | 6/2012  | Smith        | 381/86  |
| 8,331,580 | B2 | * | 12/2012 | Isozaki      | 381/86  |
| 2010/0166210 | A1 |  | 7/2010  | Isozaki      |         |

FOREIGN PATENT DOCUMENTS

| JP | 2000-10576 A  | 1/2000  |
| JP | 2009-35195 A  | 2/2009  |
| JP | 2010-155507 A | 7/2010  |
| JP | 2011-215436 A | 10/2011 |

\* cited by examiner

*Primary Examiner* — Tai T Nguyen
(74) *Attorney, Agent, or Firm* — Birch, Stewart, Kolasch & Birch, LLP

(57) ABSTRACT

A notification sound control unit of an approaching vehicle audible system includes a first rotation speed calculation section that calculates a first rotation speed, based on an accelerator opening degree signal of an electric vehicle, a second rotation speed calculation section that calculates a second rotation speed, based on a vehicle speed signal of the electric vehicle, a rotation speed synthesis section that synthesizes the first rotation speed and the second rotation speed, a virtual engine rotation speed calculation section that applies filtering processing to a synthesis rotation speed synthesized by the rotation speed synthesis section so as to calculate a virtual engine rotation speed, and a notification sound signal generation processing section that changes a pitch and a volume of a phoneme signal outputted from a phoneme, based on the virtual engine rotation speed, so as to generate a notification sound signal.

9 Claims, 17 Drawing Sheets

FIG. 3

| VEHICLE SPEED [km/h] | ACCELERATOR OPENING DEGREE [%] | | | | | | | | | | | |
|---|---|---|---|---|---|---|---|---|---|---|---|---|
| | 0 | 1-10 | 11-20 | 21-30 | 31-40 | 41-50 | 51-60 | 61-70 | 71-80 | 81-90 | 91-99 | 100 |
| 0 | 10:0 | 0:10 | 0:10 | 0:10 | 0:10 | 0:10 | 0:10 | 0:10 | 0:10 | 0:10 | 0:10 | 0:10 |
| 1-5 | 10:0 | 5:5 | 5:5 | 4:6 | 4:6 | 4:6 | 3:7 | 3:7 | 3:7 | 2:8 | 2:8 | 1:9 |
| 6-10 | 10:0 | 5:5 | 5:5 | 5:5 | 4:6 | 4:6 | 3:7 | 3:7 | 4:6 | 3:7 | 2:8 | 1:9 |
| 11-15 | 10:0 | 5:5 | 5:5 | 5:5 | 5:5 | 5:5 | 4:6 | 4:6 | 3:7 | 3:7 | 2:8 | 1:9 |
| 16-20 | 10:0 | 6:4 | 6:4 | 6:4 | 5:5 | 5:5 | 5:5 | 5:5 | 4:6 | 4:6 | 2:8 | 1:9 |
| 21-25 | 10:0 | 6:4 | 6:4 | 6:4 | 4:6 | 4:6 | 4:6 | 4:6 | 4:6 | 4:6 | 3:7 | 2:8 |
| 26-30 | 10:0 | 6:4 | 6:4 | 6:4 | 4:6 | 4:6 | 4:6 | 5:5 | 5:5 | 4:6 | 4:6 | 3:7 |
| 31-40 | 10:0 | 6:4 | 6:4 | 6:4 | 4:6 | 4:6 | 4:6 | 4:6 | 5:5 | 5:5 | 4:6 | 4:6 |
| 41-50 | 10:0 | 6:4 | 6:4 | 6:4 | 4:6 | 4:6 | 4:6 | 4:6 | 4:6 | 5:5 | 4:6 | 4:6 |
| 51-60 | 10:0 | 6:4 | 6:4 | 6:4 | 4:6 | 4:6 | 4:6 | 4:6 | 4:6 | 4:6 | 5:5 | 5:5 |
| 61-70 | 10:0 | 6:4 | 6:4 | 6:4 | 4:6 | 4:6 | 4:6 | 4:6 | 4:6 | 4:6 | 5:5 | 5:5 |
| 71-80 | 10:0 | 6:4 | 6:4 | 6:4 | 4:6 | 4:6 | 4:6 | 4:6 | 4:6 | 4:6 | 5:5 | 5:5 |
| 81-90 | 10:0 | 6:4 | 6:4 | 6:4 | 4:6 | 4:6 | 4:6 | 4:6 | 4:6 | 4:6 | 4:6 | 5:5 |
| 91-100 | 10:0 | 6:4 | 6:4 | 6:4 | 4:6 | 4:6 | 4:6 | 4:6 | 4:6 | 4:6 | 3:7 | 5:5 |
| 101~ | 10:0 | 6:4 | 6:4 | 6:4 | 4:6 | 4:6 | 4:6 | 4:6 | 4:6 | 4:6 | 2:8 | 5:5 |

| SHIFT POSITION | SYNTHESIS PROPORTION 2ND ROTATION SPEED : 1ST ROTATION SPEED |
|---|---|
| P | 0 : 10 |
| D | 4 : 6 |
| N | 0 : 10 |
| R | 6 : 4 |

FIG. 18

| GEAR VALUE | SYNTHESIS PROPORTION 2ND ROTATION SPEED : 1ST ROTATION SPEED |
|---|---|
| 1 | 2 : 8 |
| 2 | 3 : 7 |
| 3 | 4 : 6 |
| 4 | 5 : 5 |
| 5 | 6 : 4 |
| 6 | 7 : 3 |
| R | 2 : 8 |
| N | 0 : 10 |

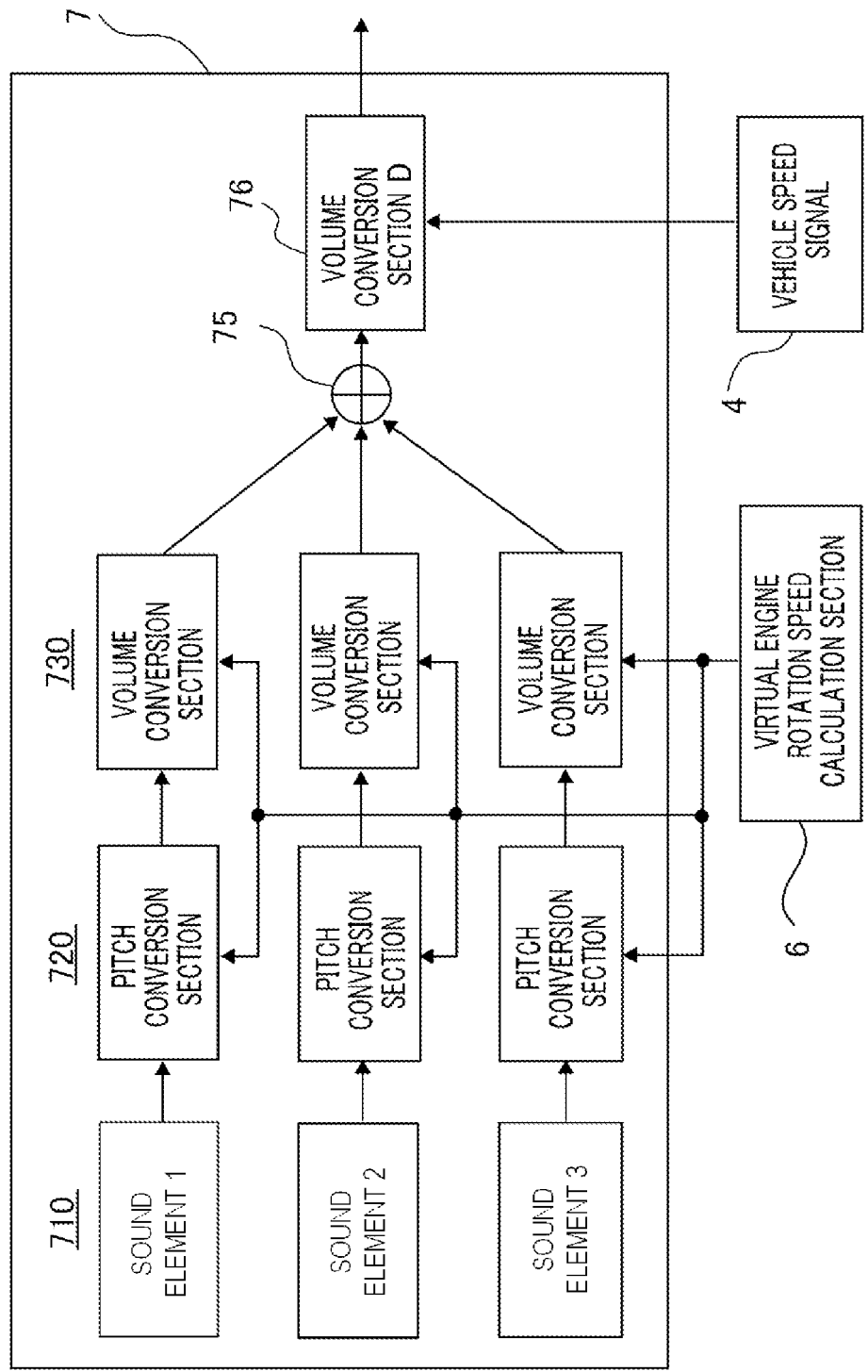

NOTIFICATION SOUND CONTROL UNIT OF APPROACHING VEHICLE AUDIBLE SYSTEM

TECHNICAL FIELD

The present invention relates to an approaching vehicle audible system that generates a sound in a high-quietness electric vehicle such as a hybrid automobile or an electric automobile so as to notify a pedestrian or the like of the existence of the electric vehicle, and particularly to signal generation for its notification sound.

BACKGROUND ART

In recent years, as various kinds of movable bodies, vehicles such as a motorcycle, an automobile, and the like have been electrified after development and practical realization of an electric bicycle, an electric cart, and the like. Specifically, while replacing an automobile that utilizes an internal combustion engine as its driving power source, a hybrid automobile, which utilizes a gasoline engine and an electric motor as its driving power source, an electric automobile, which utilizes, as its driving power source, an electric motor that operates with a domestic electric power source or a battery to be charged through an electric charger installed at a gas station or an electric power supply station, and a fuel cell automobile, which travels while generating electricity through a fuel cell that utilizes hydrogen gas or the like, as a fuel, have sequentially been developed; a hybrid automobile and an electric automobile have already been put to practical use and have started to spread.

In the case of each of a gasoline vehicle, a diesel vehicle, and a motorcycle (hereinafter, described as "a conventional automobile and the like") that each utilize a conventional internal combustion engine as the driving power source therefor, an engine sound and an exhaust sound, which are emitted by the driving power source itself, and road noise or the like during its travel are generated; therefore, a pedestrian walking in a town, a cyclist, or the like can be aware of approach of a vehicle through an engine sound, an exhaust sound, or the like. However, because during a low-speed travel, a hybrid automobile travels mainly by means of not an engine but an electric motor, no engine sound or exhaust sound is generated, and an electric automobile, a fuel cell automobile, and the like each travel by means of an electric motor in the whole driving region; thus, any one of these automobiles is extremely high-quietness electric vehicle. However, a pedestrian or a cyclist in the vicinity of such a high-quietness electric vehicle cannot perceive through a sound an approach of the electric vehicle such as a hybrid automobile, an electric automobile, or a fuel cell automobile that travels by means of a less-sound-noise and high-quietness electric motor; therefore, this may become the cause of a minor collision between the high-quietness electric vehicle and the pedestrian or the like.

Accordingly, in order to solve the foregoing problem in which the quietness, which is originally a merit of each of a hybrid automobile, a fuel cell automobile, and an electric automobile, there have been proposed various kinds of approaching vehicle audible systems, other than a horn that is provided in a conventional automobile or the like and sounds an alarm in accordance with the will of a driver, that as to notify a pedestrian in the vicinity of a reference vehicle of the existence of the reference vehicle.

Some of the approaching vehicle audible systems make a sound that resembles a conventional engine sound, as a notification sound. For example, Patent Document 1 discloses a technology that stores a matching table including an accelerator opening degree and the virtual engine rotation speed based on the accelerator opening degree so as to obtain a virtual engine rotation speed corresponding to an accelerator opening degree and an elapsed time.

Patent Document 2 discloses that data on a generated sound is stored as digital data in units of a sound pressure waveform having a length corresponding to the time during which the crank shaft rotates in one combustion cycle and that when at a rapid acceleration mode, the order of reading a plurality of digital data pieces to be reproduced is controlled for a delay of the engine rotation speed. In other words, in accordance with the values of the accelerator opening degree and the engine rotation speed, the digital data pieces to be reproduced are selected.

PRIOR ART REFERENCE

Patent Document

[Patent Document 1] Japanese Patent Application Laid-Open No. 2010-155507
[Patent Document 2] Japanese Patent Application Laid-Open No. 2000-10576

DISCLOSURE OF THE INVENTION

Problem (s) to be Solved by the Invention

In Patent Document 1, the following problems are posed. It is required that under the environment that the acceleration opening degree and the vehicle speed change every second, the state of the proportional relation between the acceleration opening degree and the vehicle speed is always monitored, and it required that based on the acceleration opening degree and a calculated engine rotation speed, distances among the sound sources are calculated and then an engine sound is synthesized; therefore, the load of the CPU increases. Moreover, when the proportional relation state and the non-proportional relation state are frequently switched, an unnatural sound may be reproduced. Furthermore, when the engine rotation speed is calculated based on the acceleration opening degree, the engine rotation speed reacts too quickly to the accelerator opening degree, because no delay is taken into consideration.

In Patent Document 2, the following problems are posed. It is required to provide a plurality of sound sources whose respective data sizes of one digital data piece is small and the sound sources are switched in accordance with the situation; therefore, the control complicated. Moreover, because the data size is small (i.e., the loop period is short), the reproduced sound is liable to be monotonous. Furthermore, the method in which in accordance with various acceleration works, only the reproduction order is controlled causes artificiality.

The present invention has been implemented in order to solve the foregoing problems in a conventional approaching vehicle audible system; the objective thereof is to provide an approaching vehicle audible system that can generate a sound closer to a conventional engine sound through simple control and that generates a notification sound with which a pedestrian or the like can be aware of the existence of an electric vehicle with a more natural sense and can autonomously behave against a danger.

Means for Solving the Problems

In the present invention, a notification sound control unit of a vehicle approach notification apparatus, generating a signal for a notification sound to be emitted from a sounding device provided in an electric vehicle in which at least part of driving force is produced by a motor to the outside of the electric vehicle, is provided with a first rotation speed calculation section that calculates a rotation speed, based on an accelerator opening degree signal among vehicle information signals of the electric vehicle, a second rotation speed calculation section that calculates a rotation speed, based on a vehicle speed signal among vehicle information signals of the electric vehicle, a rotation speed synthesis section that synthesizes a first rotation speed calculated by the first rotation speed calculation section and a second rotation speed calculated by the second rotation speed calculation section, a virtual engine rotation speed calculation section that applies filtering processing to a synthesis rotation speed synthesized by the rotation speed synthesis section so as to calculate a virtual engine rotation speed, and a notification sound signal generation processing section that changes a pitch and a volume of a sound element signal outputted from a sound element, based on the virtual engine rotation speed, so as to generate a notification sound signal.

Advantage of the Invention

The present invention makes it possible that as the notification sound of an electric vehicle, a sound closer to a sound emitted by an engine automobile is emitted in various kinds of modes of the vehicle; thus, because a pedestrian and the like perceive the existence of the electric vehicle with a sense closer to the sense for an engine automobile, an autonomous danger-avoiding behavior can be taken.

BRIEF DESCRIPTION OF THE DRAWINGS

FIG. 3 is a flowchart representing an example of table for determining the synthesis proportion in a rotation speed synthesis section of the notification sound control unit of the approaching vehicle audible system according to Embodiment 1 of the present invention;

FIG. 18 is a chart representing an example of table for determining the synthesis proportion in a rotation speed synthesis section of the notification sound control unit of the approaching vehicle audible system according to Embodiment 2 of the present invention; and FIG. 19 is a block diagram representing the basic configuration of a notification sound signal generation processing section in a notification sound control unit of an approaching vehicle audible system according to Embodiment 3 of the present invention.

EMBODIMENTS FOR CARRYING OUT THE INVENTION

Embodiment 1

Figure 1:
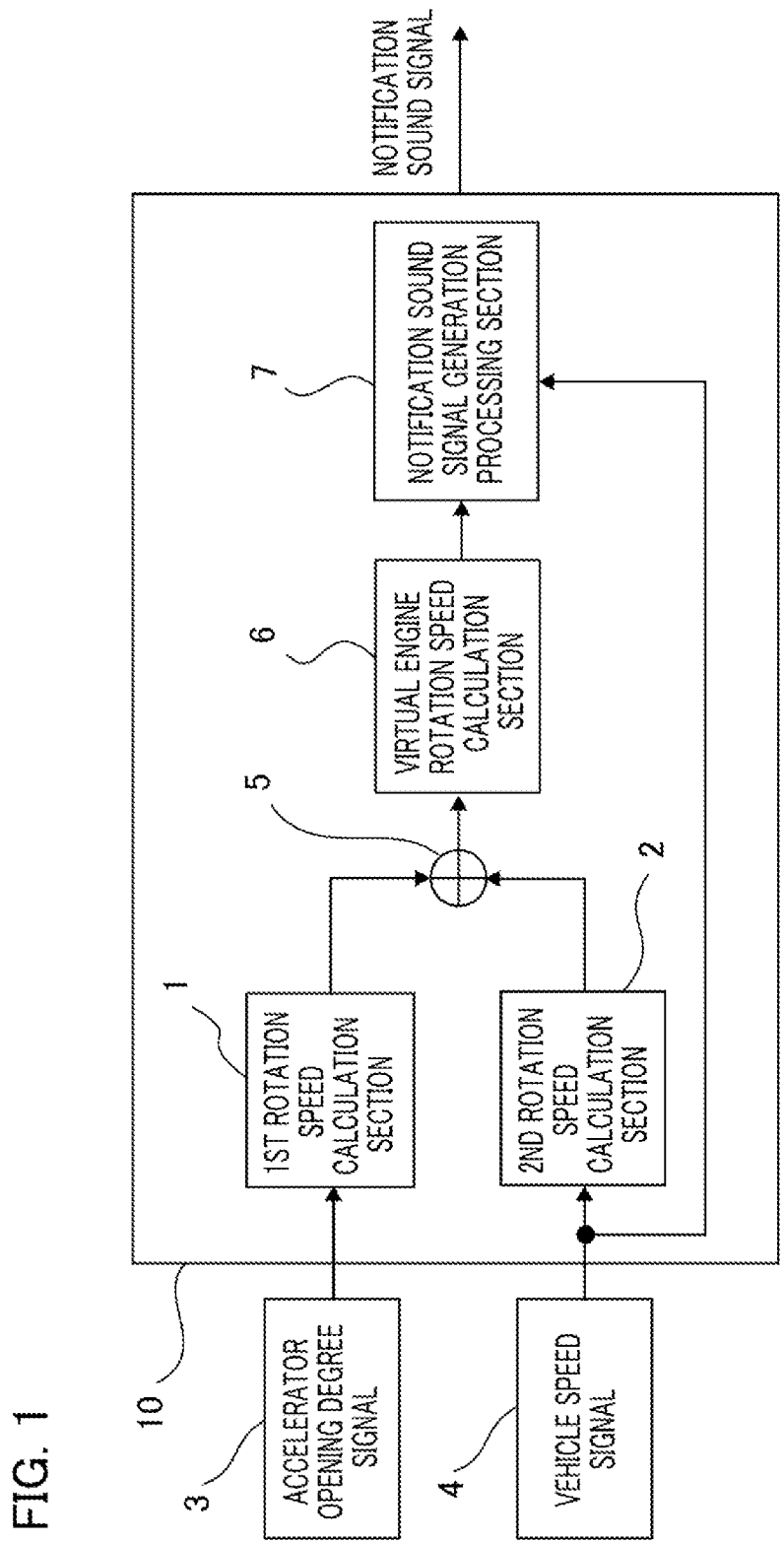
FIG. 1 is a block diagram representing the configuration of a notification sound control unit of an approaching vehicle audible system according to Embodiment 1 of the present invention.
Figure 2:
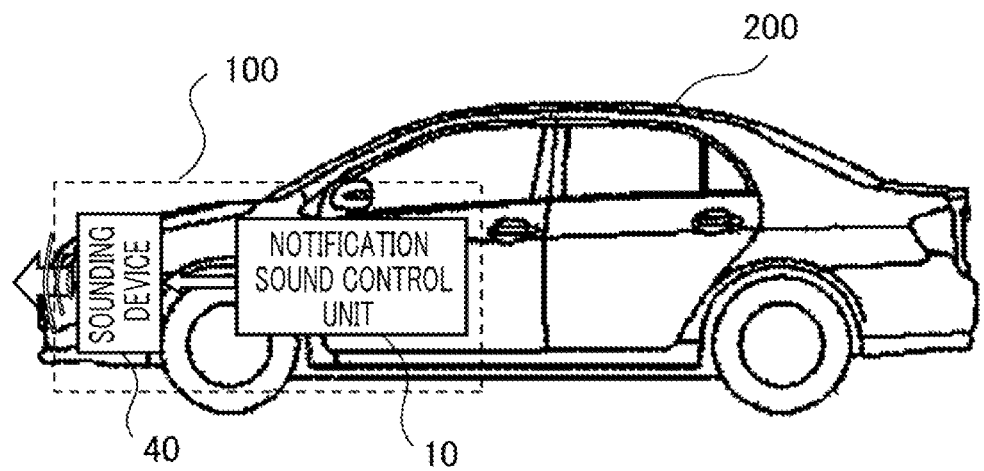
FIG. 2 is a conceptual view of an approaching vehicle audible system to which a notification sound control unit of an approaching vehicle audible system according to the present invention is applied.

FIG. 2 illustrates a conceptual view of an approaching vehicle audible system to which the present invention is applied. An approaching vehicle audible system 100 is provided in an electric vehicle 200, such as an electric automobile or a hybrid automobile, that generates at least part of driving force by means of an electric motor. The approaching vehicle audible system 100 is provided with a notification sound control unit 10 that outputs a notification sound signal and a sounding device 40, such as a speaker, that emits a notification sound outside the vehicle in accordance with the notification sound signal. FIG. 1 is a block diagram representing the configuration of the notification sound control unit of the approaching vehicle audible system according to Embodiment 1 of the present invention. Hereinafter, the configuration of the notification sound control unit 10 illustrated in FIG. 1 and the line of the operation thereof will be explained. A notification sound control unit of an approaching vehicle audible system according to the present invention is applied to an electric vehicle such as an electric automobile and generates the signal of a sound to be emitted as a notification sound from the electric vehicle in order to make a pedestrian or the like in the vicinity of the electric vehicle perceive the existence of the electric vehicle. Accordingly, based on vehicle information items such as an accelerator opening degree or a vehicle speed, a virtual engine rotation speed corresponding to the rotation speed of the engine of a conventional engine automobile is calculated; then, a notification sound signal is generated in accordance with the calculated virtual engine rotation speed. The rotation speed herein denotes the number of rotations per unit time, for example, a value expressed by the number of rotations per minute (rpm). In FIG. 1, a first rotation speed calculation section 1 calculates a first rotation speed corresponding to the engine rotation speed, based on an accelerator-depressing amount operated by the driver of an electric vehicle, i.e., an accelerator opening degree signal 3. A second rotation speed calculation section 2 calculates a second rotation speed corresponding to the engine rotation speed, based on a vehicle speed signal 4. The accelerator opening degree signal 3 and the vehicle speed signal 4 are obtained from an in-vehicle communication line such as a CAN (Controller Area Network).

The first rotation speed calculated by the first rotation speed calculation section 1 based on the accelerator opening degree signal 3 and the second rotation speed calculated by the second rotation speed calculation section 2 based on the vehicle speed signal 4 are synthesized in a rotation speed synthesis section 5, so that a synthesis rotation speed is obtained. Then, a virtual engine rotation speed calculation section 6 processes the synthesis rotation speed through processing utilizing a filter or the like so as to calculate a final virtual engine rotation speed. Based on the calculated virtual engine rotation speed, a notification sound signal generation processing section 7 controls the pitch (pitch of a sound) and the volume of a sound element sound and outputs a notification sound signal. The notification sound signal is amplified by an unillustrated amplifier, and then a notification sound is emitted from a sounding device 40 such as a speaker. Based on the vehicle speed signal 4, the notification sound signal generation processing section 7 also performs control such as not outputting the notification sound signal when it is not required to generate a notification sound, for example, when the automobile speed is faster than a predetermined speed.

In this situation, an example of calculation equation for the rotation speed to be calculated by the first rotation speed calculation section 1 is given by the equation (1).

$$\text{First rotation speed} = R(MIN) + \{R(MAX) - R(MIN)\} \times APP/100 \quad (1)$$

where R(MIN) denotes the minimum value [rpm] of the rotation speed (rotation speed at a time when the accelerator opening degree is 0%); R(MAX) denotes the maximum value [rpm] of the rotation speed (rotation speed at a time when the accelerator opening degree is 100%); APP denotes the obtained accelerator opening degree.

The first rotation speed may be calculated according to such an equation as represented by the equation (1) or may be obtained by reading table data.

An example of calculation equation for the rotation speed to be calculated by the second rotation speed calculation section 2 is given by the equation (2).

$$\text{Second rotation speed} = a/N \times SP + b \quad (2)$$

where SP denotes obtained vehicle speed[km/h]; a denotes a weight coefficient; b denotes the rotation speed [rpm] at a time when the vehicle speed is 0 km/h; N denotes a transmission ratio.

The second rotation speed may be calculated according to such an equation as represented by the equation (2) or may be obtained by reading table data. In the equation (2), a, b, and N may be either fixed values or variable.

The rotation speed synthesis section 5 performs synthesis (addition or multiplication) of the first rotation speed calculated based on an accelerator opening degree and the second rotation speed calculated based on a vehicle speed, in accordance with a determined synthesis proportion. The synthesis proportion may be a fixed value, a variable to be determined from the values of vehicle information items such as an accelerator opening degree and a vehicle speed, or a variable to be determined based on the result of the calculation by each of the rotation speed calculation sections. For example, in the case where the vehicle information items are the accelerator opening degree and the vehicle speed, the synthesis proportion may be determined based on the accelerator opening degree and the vehicle speed in each given fixed period, obtained from table data, as represented in FIG. 3, including accelerator opening degrees and vehicle speeds.

The synthesis proportion may also be determined from the ratio of the accelerator opening degree to the vehicle speed. Equations (3) and (4) represent an example of method of determining the ratio.

$$\text{Ratio} = \text{accelerator opening degree/vehicle speed} \quad (3)$$

$$\text{Ratio} = \tan^{-1}(\text{accelerator opening degree/vehicle speed}) \quad (4)$$

Figures 4, 5:
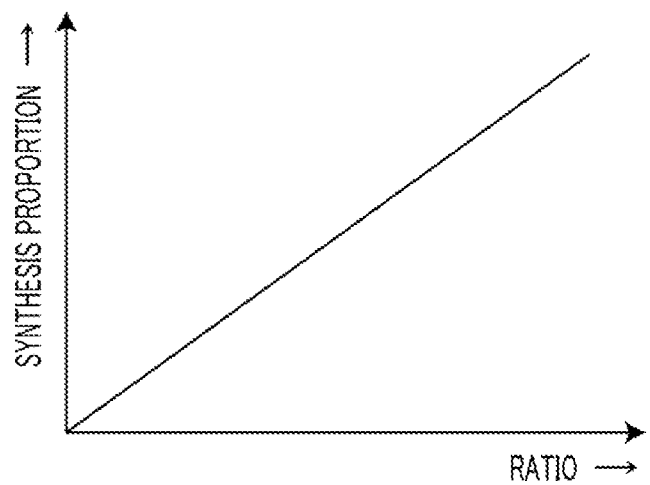
FIG. 4 is a flowchart representing an example of method for determining the synthesis proportion based on a ratio in the rotation speed synthesis section of the notification sound control unit of the approaching vehicle audible system according to Embodiment 1 the present invention.
FIG. 5 is a flowchart representing another example of table for determining the synthesis proportion in the rotation speed synthesis section of the notification sound control unit of the approaching vehicle audible system according to Embodiment 1 of the present invention.

For example, the relationship between the ratio and the synthesis proportion, as represented in FIG. 4, is preliminarily determined, and then the synthesis proportion is determined from the ratio obtained by the equation (3) or (4). In this situation, as each of the accelerator opening degree and the vehicle speed, an instantaneous value at a given time point may be utilized; alternatively, considering a case where the accelerator opening degree and the vehicle speed largely change, the respective average values of the accelerator opening degrees and the vehicle speeds or the average value of the ratios in a fixed period may be utilized.

Furthermore, the synthesis proportion may be determined from the ratio of the first rotation speed calculated by the first rotation speed calculation section 1 to the second rotation speed calculated by the second rotation speed calculation section 2. Equations (5) and (6) represent an example of method of determining the ratio.

$$\text{Ratio} = \text{first rotation speed/second rotation speed} \quad (5)$$

$$\text{Ratio} = \tan^{-1}(\text{first rotation speed/second rotation speed}) \quad (6)$$

For example, the relationship between the ratio and the synthesis proportion, as represented in FIG. 4, is preliminarily determined, and then the synthesis proportion is determined from the ratio obtained by the equation (5) or (6). In this situation, as each of the rotation speed calculated by the first rotation speed calculation section 1 and the rotation speed calculated by second rotation speed calculation section 2, an instantaneous value at a given time point may be utilized; alternatively, considering a case where the accelerator opening degree and the vehicle speed largely change, the respective average values of the first rotation speeds and the second rotation speeds or the average value of the ratios in a fixed period may be utilized.

Alternatively, the synthesis proportion may also be determined in accordance with the shift position. FIG. 5 represents an example in which the synthesis proportion is determined in accordance with the shift position. When the shift position is P (parking) or N (neutral), the vehicle speed is "0"; thus, the proportion of the first rotation speed, which is a rotation speed calculated based on the acceleration opening degree, is set to 10, i.e., 100%. When the shift position is D (drive), the proportion of the second rotation speed to the first rotation speed is set to 4:6; when the shift position is R (rear), the proportion of the second rotation speed to the first rotation speed is set to 6:4. Even when the synthesis proportion is set to such a simple value, the engine sound of a conventional engine automobile can be simulated to some extent.

The first rotation speed, which is calculated based on the accelerator opening degree signal 3, firstly reflects the conscious operation by the user and hence includes the element of an entertainment performance. The second rotation speed, which is calculated based on the vehicle speed signal 4, barely reflects the conscious operation by the user; however, it is a value based on an actual vehicle behavior. In order to obtain a rotation speed in which not only the conscious operation by the user and the entertainment performance but also the actual vehicle behavior is reflected, it is more desirable to acquire a rotation speed obtained by synthesizing the first rotation speed and the second rotation speed and then change the synthesis proportion in accordance with the condition than to switch the first rotation speed and the second rotation speed. As a result, a rotation speed having an excellent temporal continuity and a more natural sense can be obtained.

Figure 6:
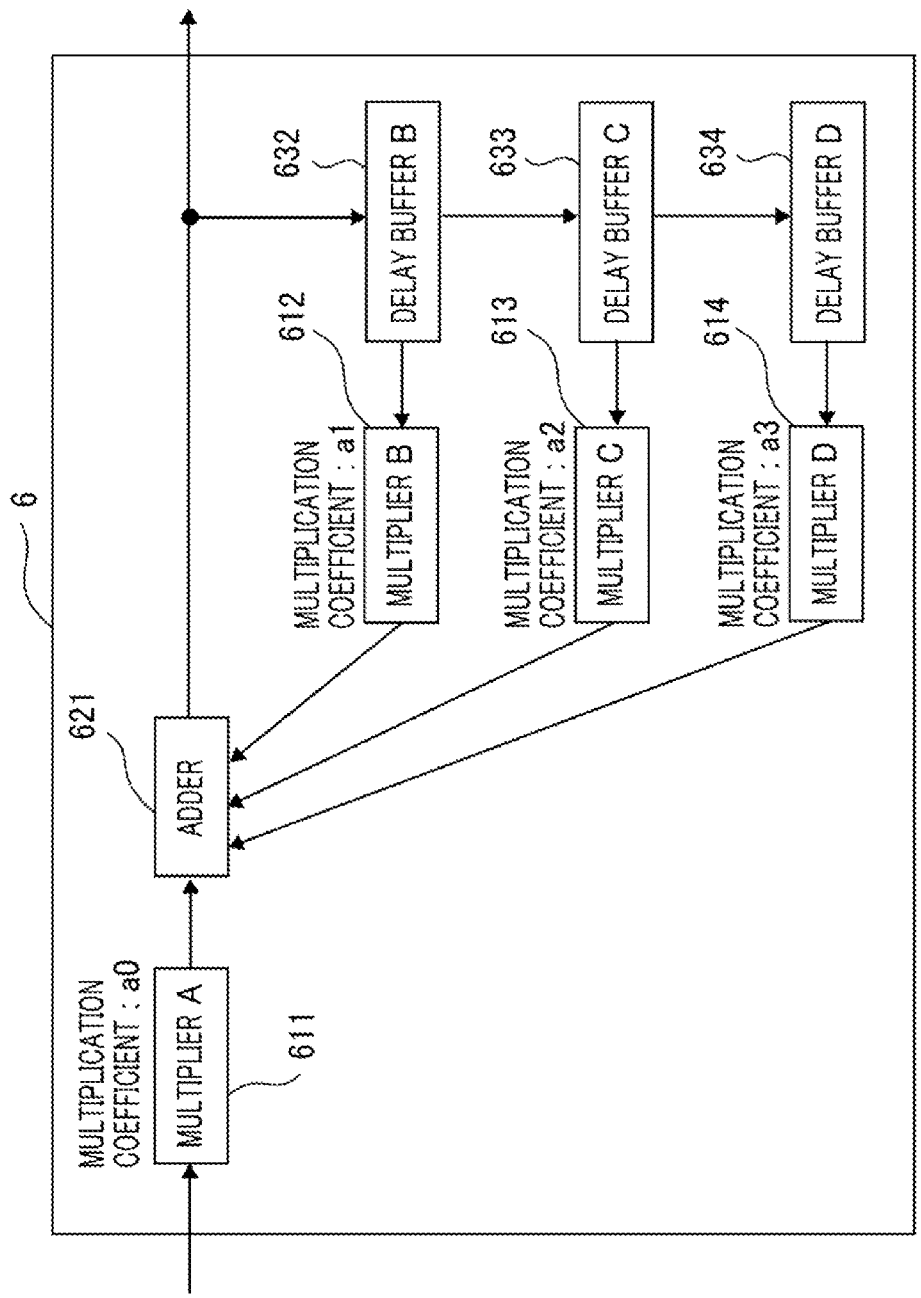
FIG. 6 is a block diagram representing an example of configuration of a virtual engine rotation speed calculation section in the notification sound control unit of the approaching vehicle audible system according to Embodiment 1 of the present invention.

Next, the operation of the virtual engine rotation speed calculation section 6 will be explained. Based on the synthesis rotation speed synthesized by the rotation speed synthesis section 5, the virtual engine rotation speed calculation section 6 calculates a closer-to-engine and more natural virtual engine rotation speed by use of a predetermined approximation equation. FIG. 6 represents an example of configuration of the rotation speed synthesis section that realizes the approximation equation. In the configuration represented in FIG. 6, a multiplier A 611 multiplies the synthesis rotation speed synthesized by the rotation speed synthesis section 5 by a multiplication coefficient a0 so as to obtain an appropriate rotation speed. The rotation speed, which is the result of the calculation by the multiplier A, is delayed by a delay buffer B 632, multiplied by a multiplication coefficient a1 in a multiplier B 612, and then is added to the original rotation speed in an adder 621. Moreover, the rotation speed delayed by the delay buffer B 632 is further delayed by a delay buffer C 633, multiplied by a multiplication coefficient a2 in a multiplier C 613, and then is added in the adder 621. Furthermore, the rotation speed delayed by the delay buffer C 633 is further delayed by a delay buffer D 634, multiplied by a multiplication coefficient a3 in a multiplier D 614, and then is added in the adder 621. As described above, in FIG. 6, a feedback filter is configured in which a temporally changing rotation speed is delayed by a delay buffer and then fed back; the feedback can average the accumulated past variations. When the multiplication coefficients a1, a2, and a3 are set to be smaller in that order (i.e., a1>a2>a3), feedback can be achieved in which the more past the rotation speed is, the smaller effect it provides.

Figure 7:
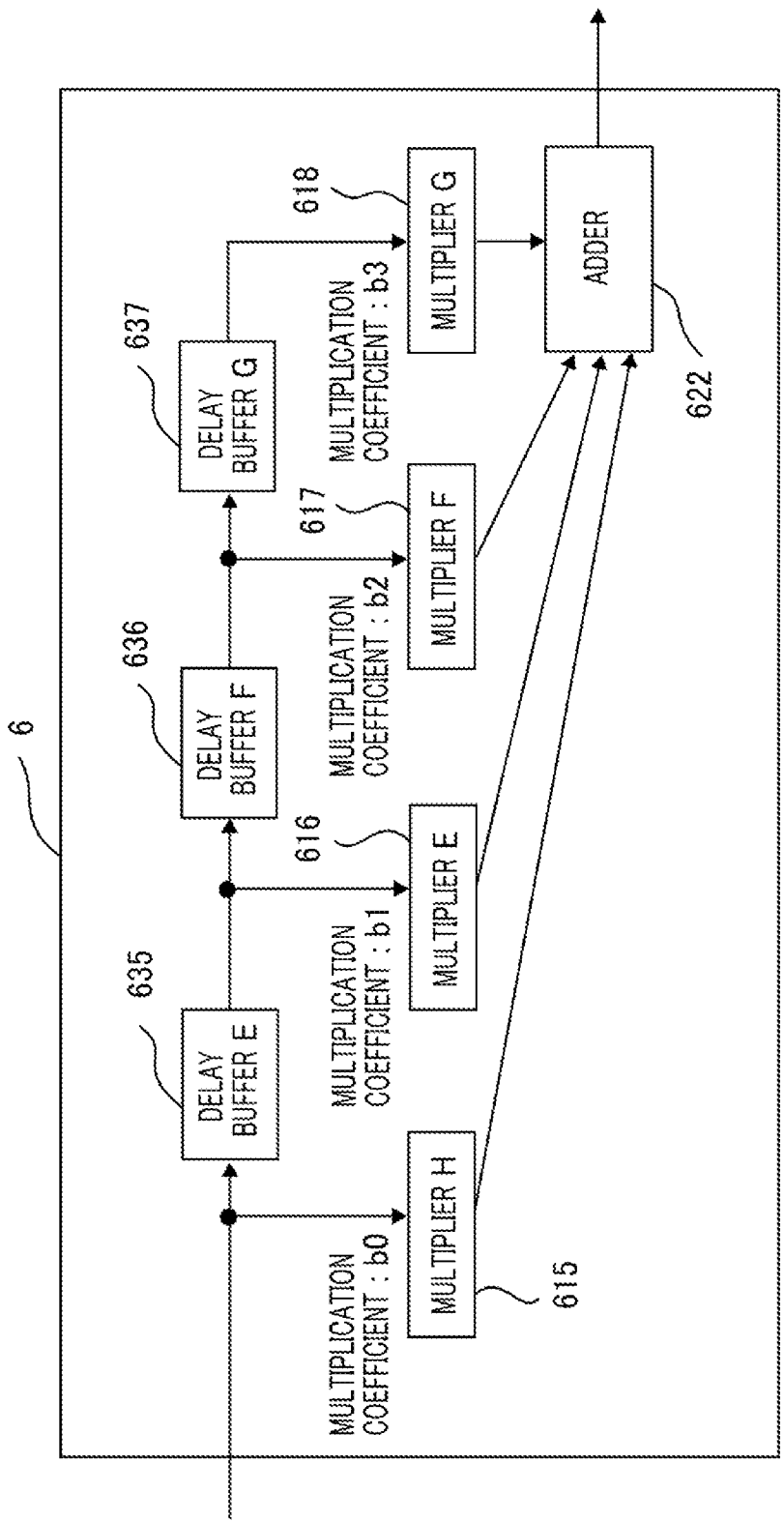
FIG. 7 is a block diagram representing another example of configuration of the virtual engine rotation speed calculation section in the notification sound control unit of the approaching vehicle audible system according to Embodiment 1 of the present invention.

FIG. 7 represents an example of configuration of the rotation speed synthesis section 5 that realizes another approximation equation. In the configuration represented in FIG. 7, a multiplier H 615 multiplies a synthesis rotation speed synthesized by the rotation speed synthesis section 5 by a multiplication coefficient b0 so as to obtain an appropriate rotation speed and then input the appropriate rotation speed to an adder 622. The synthesis rotation speed synthesized by the rotation speed synthesis section 5 is delayed by a delay buffer B 635, multiplied by a multiplication coefficient b1 in a multiplier E 616, and then inputted to the adder 622. Moreover, the rotation speed that has been delayed by the delay buffer E 635 is further delayed by a delay buffer F 636, multiplied by a multiplication coefficient b2 in a multiplier F 617, and then inputted to the adder 622. Furthermore, the rotation speed that has been delayed by the delay buffer F 636 is further delayed by a delay buffer G 637, multiplied by a multiplication coefficient b3 in a multiplier G 618, and then inputted to the adder 622. As described above, in FIG. 7, a non-feedback filter is configured in which a temporally changing rotation speed is delayed by a delay buffer; the rotation speed is not fed back, so that while the past variations corresponding to the number of delay elements (for a predetermined period) are averaged, the instantaneousness for a sudden change can be raised.

As the approximation equation in the virtual engine rotation speed calculation section 6, a moving average can be utilized. An example of moving average for calculating a virtual engine rotation speed ImR (NEW) is given by the equation (7).

$$ImR(\text{NEW}) = \{ImR(\text{OLD}) \times (N-1) + R(\text{NEW})\}/N \qquad (7)$$

where ImR (OLD) denotes the virtual engine rotation speed [rpm] that has been calculated last time; R(NEW) denotes the rotation speed [rpm] that is obtained this time from the rotation speed synthesis section; N denotes a coefficient. In the case of moving-average approximation equation given by the equation (7), although the latest rotation speed is emphasized, the past data pieces are not completely eliminated but are averaged. The equation (7) represents an example of exponential moving average; however, the moving average is not limited thereto.

Figure 8:
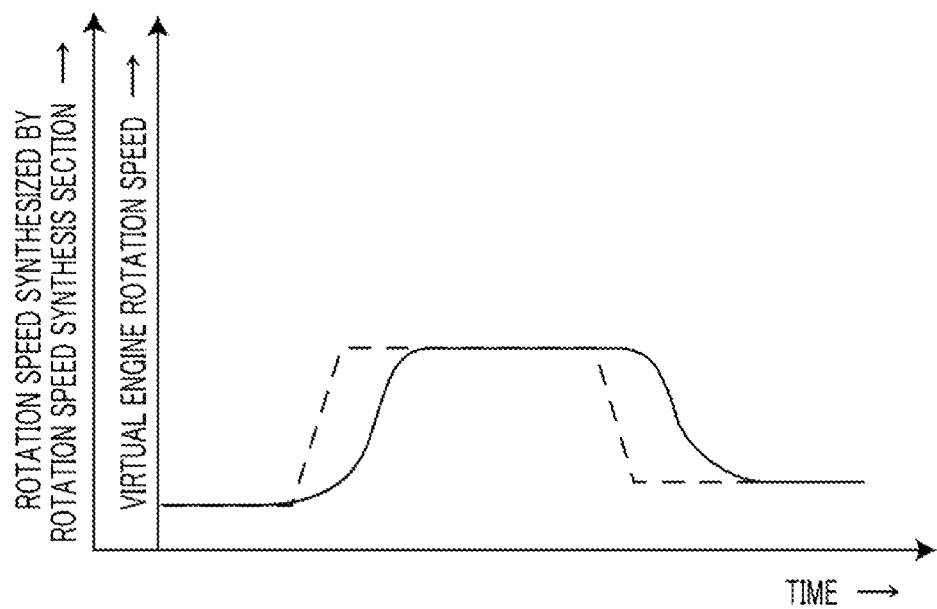
FIG. 8 is a block diagram representing an example of operation of the virtual engine rotation speed calculation section in the notification sound control unit of the approaching vehicle audible system according to Embodiment 1 of the present invention.

FIG. 8 represents the effect of the virtual engine rotation speed calculation section. In FIG. 8, the broken line represents an example of time change in the rotation speed synthesized by the rotation speed synthesis section 5; the solid line represents an example of virtual engine rotation speed calculated through an approximation equation, based on the synthesized rotation speed. As can be seen from FIG. 8, the virtual engine rotation speed rises or falls in a delayed manner in comparison with the rotation speed synthesized by the rotation speed synthesis section 5. In other words, when rising, the virtual engine rotation peed gradually rises in a delayed manner, and when falling, the virtual engine rotation speed gradually falls with some inertia; thus, a rotation speed can be simulated that is closer to the rotation speed of an actual gasoline engine having an inertia moment, a viscous resistance, and the like.

Figure 9:
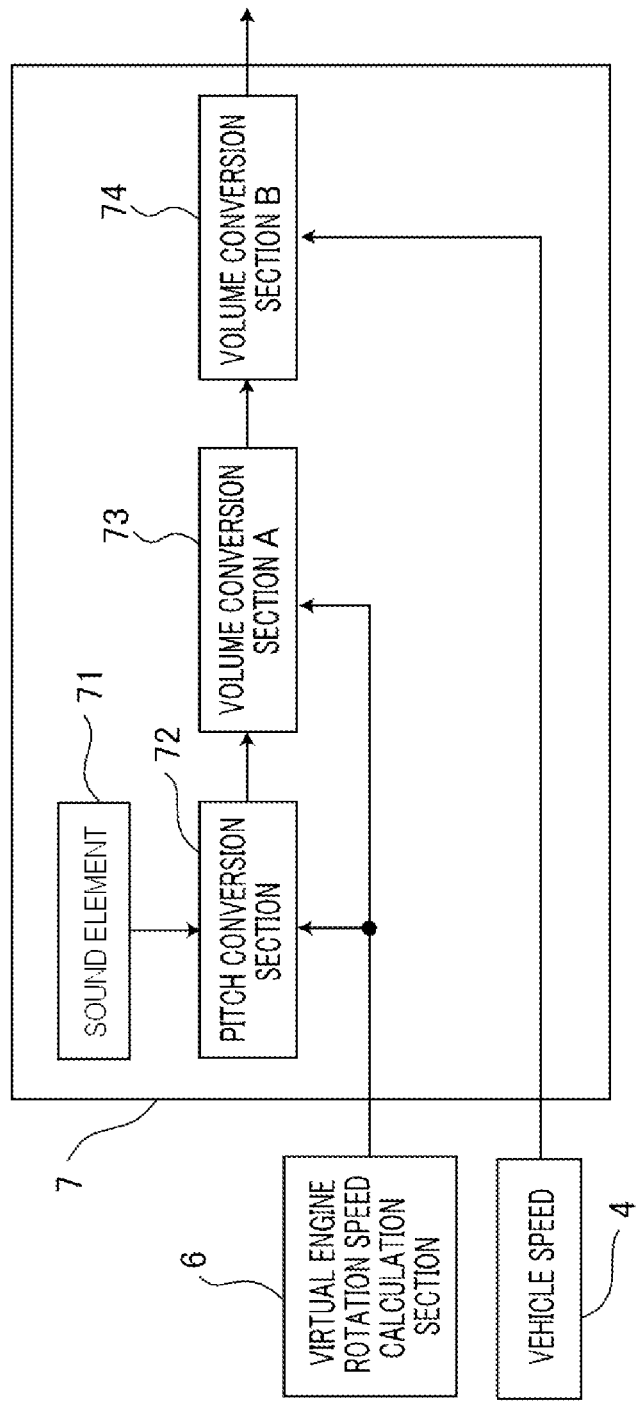
FIG. 9 is a block diagram representing the basic configuration of a notification sound signal generation processing section in the notification sound control unit of the approaching vehicle audible system according to Embodiment 1 of the present invention.

The notification sound signal generation processing section 7 utilizes, as a parameter, a virtual engine rotation speed calculated by the virtual engine rotation speed calculation section 6 so as to change the pitch and the volume of a sound element, and then outputs, as a notification sound signal, a notification sound to be emitted. FIG. 9 represents an example of basic configuration of the notification sound signal generation processing section 7 according to Embodiment 1. A sound element is a loop sound obtained by storing for a predetermined time digital data of a sound created, for example, through PCM, as data of a sound that is a base of the notification sound. The predetermined time is a short time, for example, one second in which the sound element can be recognized as a sound. Based on the pitch magnification corresponding to the value of the virtual engine rotation speed calculated by the virtual engine rotation speed calculation section 6, the pitch conversion section 72 modifies the sound signal of a sound element 71 and outputs the modified sound signal. For example, in the case where the pitch magnification is 2.0, in order to double the pitch, i.e., the frequency of the sound, the sound data in which data pieces of the sound element are thinned out by half is created, i.e. when the original sound element is one-second data, 0.5-second data is created and then is outputted as sound data that repeats the 0.5-second data. Based on the volume magnification corresponding to the value of the virtual engine rotation speed, the volume conversion section A 73 modifies the volume of the sound data outputted from the pitch conversion section 72, i.e., the amplitude thereof.

Figure 10:
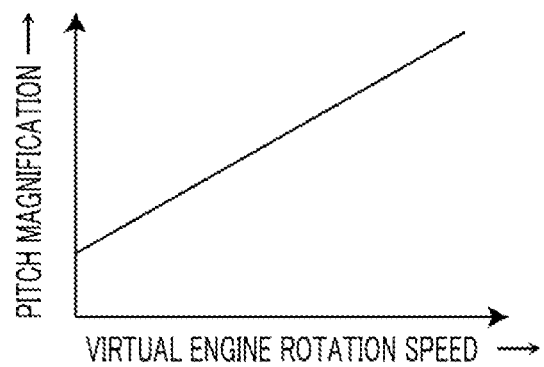
FIG. 10 is a graph represent an example of pitch magnification in a pitch conversion section of the notification sound control unit of the approaching vehicle audible system according to Embodiment 1 of the present invention.
Figure 11:
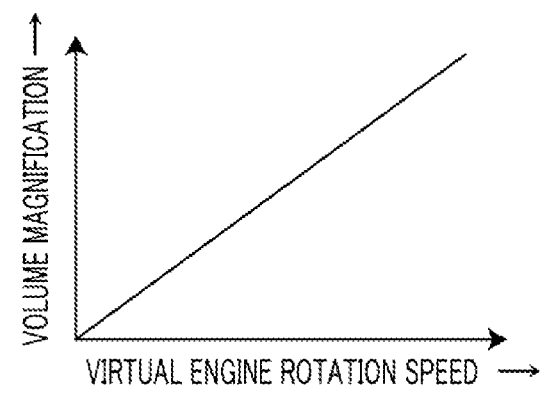
FIG. 11 is a graph representing an example of volume magnification in a pitch conversion section of the notification sound control unit of the approaching vehicle audible system according to Embodiment 1 of the present invention.

Moreover, the volume conversion section B 74 can modify the volume even in accordance with the vehicle speed. In the case where the notification sound is muted when the vehicle speed exceeds a given speed, this can also be utilized as a muting function; alternatively, utilizing the fact that as the vehicle speed rises, the road noise becomes larger, this can also be utilized for gradually reducing the volume of the notification sound as the vehicle speed rises. FIGS. 10 and 11 represent an example of pitch magnification vs. virtual engine rotation speed characteristic and an example of volume magnification vs. virtual engine rotation speed characteristic, respectively. FIG. 10 represents the fact that as the value of the virtual engine rotation speed increases, the pitch magnification is increased. FIG. 11 represents the fact that as the value of the virtual engine rotation speed increases, the volume magnification is increased.

Figure 12:
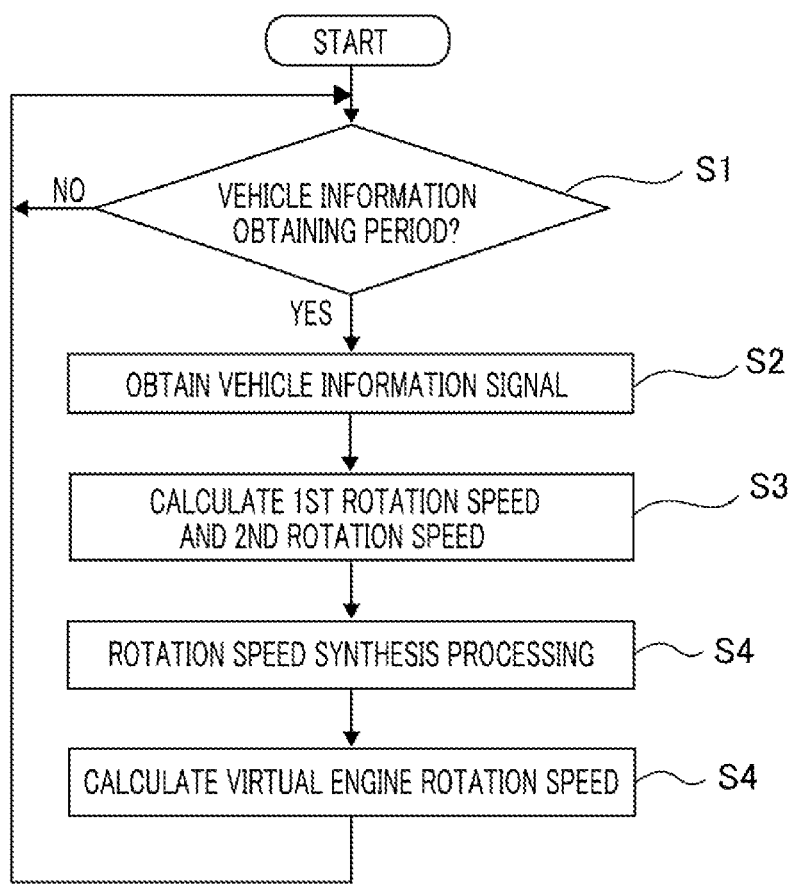
FIG. 12 is a flowchart representing the operation of calculating a virtual engine rotation speed in the notification sound control unit of the approaching vehicle audible system according to Embodiment 1 of the present invention.
Figure 13:
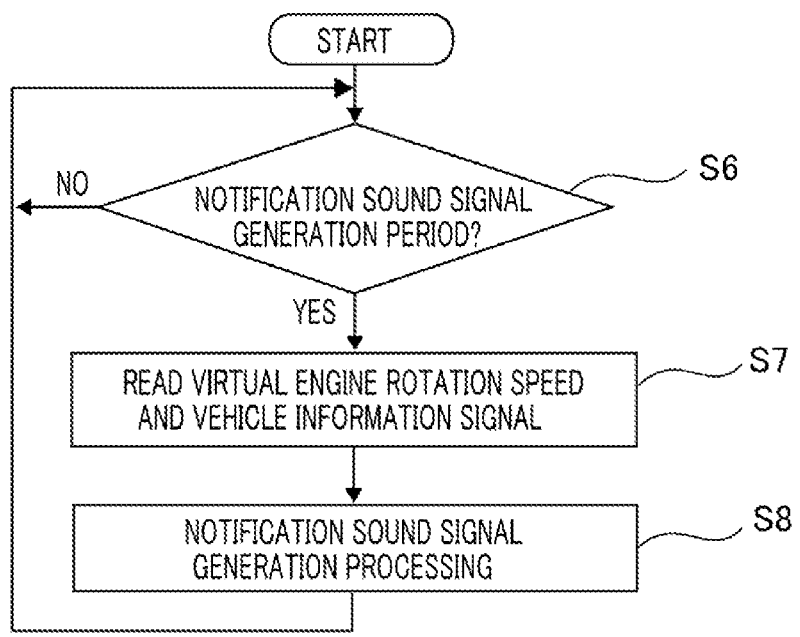
FIG. 13 is a flowchart representing the operation of notification sound signal generation processing in the notification sound control unit of the approaching vehicle audible system according to Embodiment 1 of the present invention.

FIGS. 12 and 13 represent the foregoing respective processing flows. FIG. 12 represents the flow of calculating the virtual engine rotation speed; FIG. 13 represents the flow of notification sound signal generation processing. In the flow, in FIG. 12, of calculating the virtual engine rotation speed, it is firstly determined whether or not the present timing is in a vehicle information obtaining period (S1); when the present timing is in the vehicle information obtaining period (S1: YES), a vehicle information signal is obtained (S2). In the present embodiment, as the vehicle information, the accelerator opening degree signal and the vehicle speed signal are obtained. Next, by use of the value of the obtained accelerator opening degree signal, the first rotation speed calculation section 1 calculates the first rotation speed, for example, through the equation (1); by use of the value of the obtained vehicle speed signal, the second rotation speed calculation section 2 calculates the second rotation speed, for example, through the equation (2)(S3). Next, the rotation speed synthesis section 5 determines the synthesis proportion for synthesizing the calculated first and second rotation speeds and performs rotation speed synthesis processing by use of the synthesis proportion (S4). Next, based on the rotation speed obtained through the synthesis processing, the virtual engine rotation speed calculation 6 calculates a virtual engine rotation speed by use of a predetermined approximation equation (S5).

In the notification sound signal generation processing flow in FIG. 13, the notification sound signal generation processing section 7 determines whether or not the present timing is in a notification sound output period that is determined by a notification sound sampling rate or the like (S6); in the case where the present ing is in the notification sound output period (S6: YES), the virtual engine rotation speed calculated by the virtual engine rotation speed calculation section 6 and the vehicle information signal are read (S7). By use of the read virtual engine rotation speed and vehicle information signal, the signal of a sound element is processed, so that the notification sound signal is generated (S8).

The reason why in the foregoing explanation, the virtual engine rotation speed calculation flow (task) and the notification sound signal generation processing flow (task) are separated from each other is that the virtual engine rotation speed calculation flow (task) depends on the obtaining timing of the vehicle information signal such as the accelerator opening degree, the vehicle speed, or the like and the notification sound signal generation processing flow (task) depends on the notification sound signal generation timing (e.g., notification sound sampling rate) of the notification sound signal generation processing section 7. In Embodiment 1, as represented in FIGS. 12 and 13, the configuration of the separate flows, i.e., the multi-task configuration has been utilized so as to deal with a case where the vehicle control signal obtaining timing and the notification sound signal generation timing are different from each other; however, the multi-task configuration is not necessarily required; thus, it may be allowed that the vehicle information obtaining period and the notification sound generation period are made to be the same so that a series flow (single task) is configured.

Embodiment 2

Figure 14:
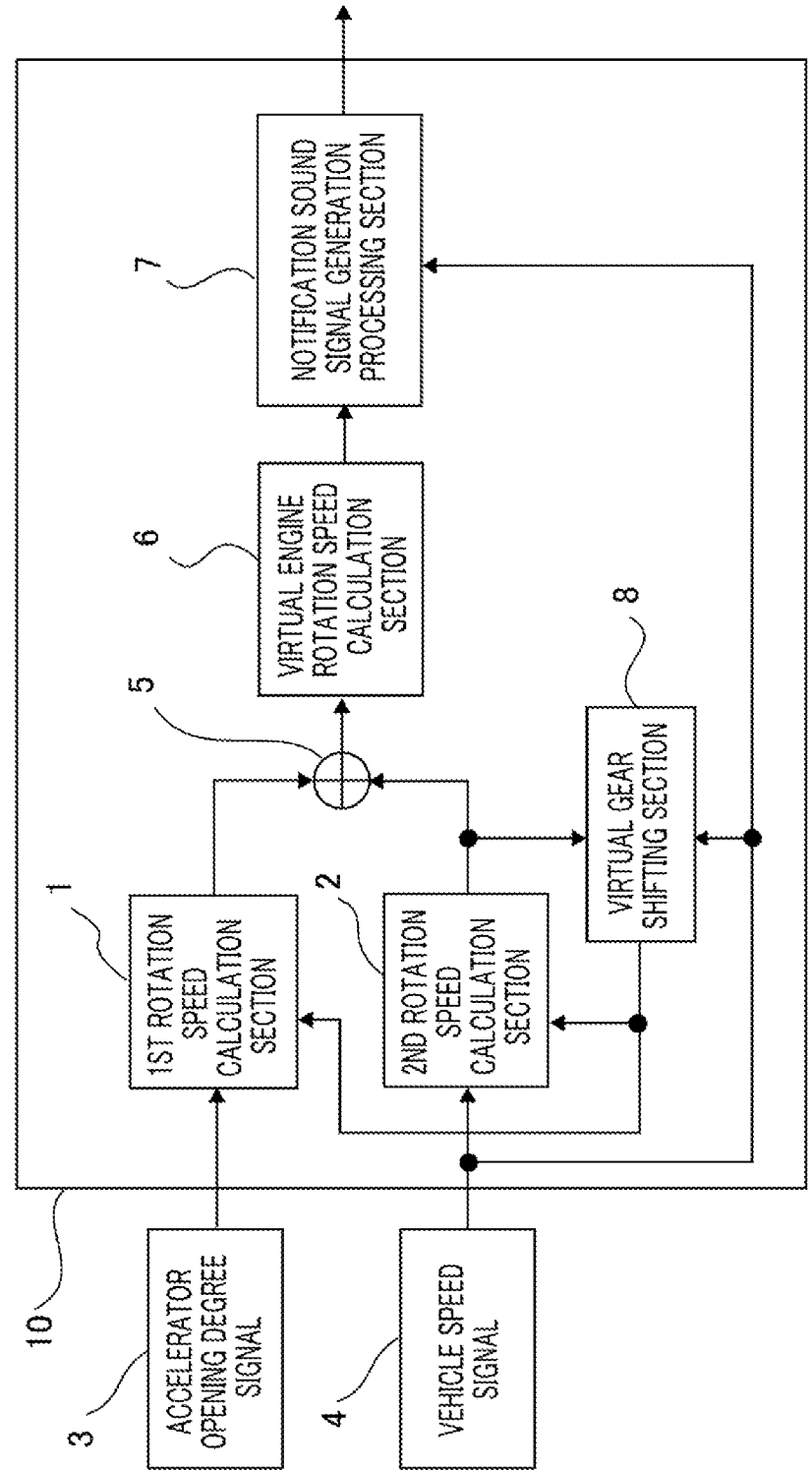
FIG. 14 is a block diagram representing the configuration of a notification sound control unit of an approaching vehicle audible system according to Embodiment 2 of the present invention.

FIG. 14 is a block diagram representing the configuration of a notification sound control unit of an approaching vehicle audible system according to Embodiment 2 of the present invention. In Embodiment 2, a virtual gear is introduced so that the rotation speed is calculated by use of the value of the virtual gear. As represented in FIG. 14, a virtual gear shifting section 8 receives the value of the second rotation speed calculated based on the vehicle signal 4 in the second rotation speed calculation section 2, determines a gear value in accordance with the value of the second rotation speed, and then notifies the first rotation speed calculation section 1 and the second rotation speed calculation section 2 of variable parameters in accordance with the gear value.

Figure 15:
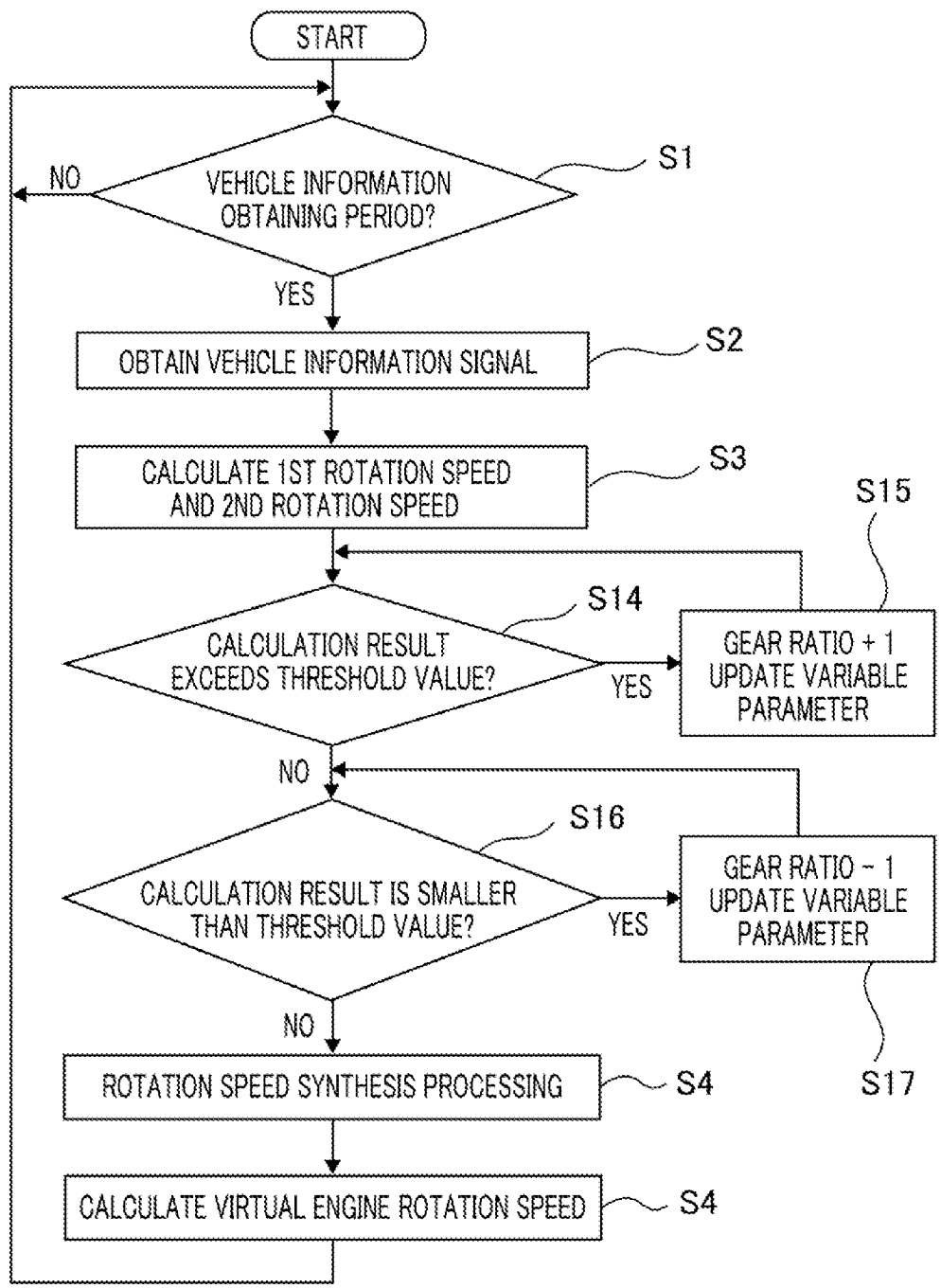
FIG. 15 is a flowchart representing the operation of calculating a virtual engine rotation speed in the notification sound control unit of the approaching vehicle audible system according to Embodiment 2 of the present invention.

FIG. 15 represents a virtual engine rotation speed calculation flow in the notification sound control unit of the approaching vehicle audible system according to Embodiment 2 of the present invention. In FIG. 15, the steps including and before the step of the first rotation speed calculation and the second rotation speed calculation (S1, S2, and S3), the rotation speed synthesis processing (S4) and the virtual engine rotation speed calculation (S5) are the same as those steps in FIG. 12 in Embodiment 1. In the following explanation, the flow of the virtual engine rotation speed calculation will be described with the steps S14 through S17 added in FIG. 15.

The virtual gear shifting section 8 determines whether or not the rotation speed calculated by the second rotation speed calculation section 2 is larger than a threshold value (S14); in the case where the rotation speed calculated by the second rotation speed calculation section 2 is larger than the threshold value (S14: YES), the gear value is shifted upward by one step and the rotation speed is calculated so as to be updated (S15). The virtual gear shifting section 8 determines again whether or not the updated rotation speed is larger than the threshold value (S14); in the case where the updated rotation speed is still larger than the threshold value (S14: YES), the gear value is further shifted upward by one step and the rotation speed is calculated so as to be updated (S15). In the case where the rotation speed calculated by the second rotation speed calculation section 2 is not larger than the threshold value (S14: NO), the virtual gear shifting section 8 determines whether or not the rotation speed is smaller than the threshold value (S16); in the case where the rotation speed is smaller than the threshold value (S16: YES), the gear value is shifted down rd by one step and the rotation speed is calculated so as to be updated (S17). The virtual gear shifting section 8 determines again whether or not the updated rotation speed is smaller than the threshold value (S16); in the case where the updated rotation speed is still smaller than the threshold value (S16: YES), the gear value is further shifted downward by one step and the rotation speed is calculated so as to be updated (S17). Eased on the changed gear value, the virtual gear shifting section 8 notifies the first rotation speed calculation section 1 of the minimum value and the maximum value of the rotation speed (i.e., R(MIN) and R(MAX) in the equation (1)) and notifies the second rotation speed calculation section 2 of the weight coefficient a and the transmission ratio N in the equation (2).

Figure 16:
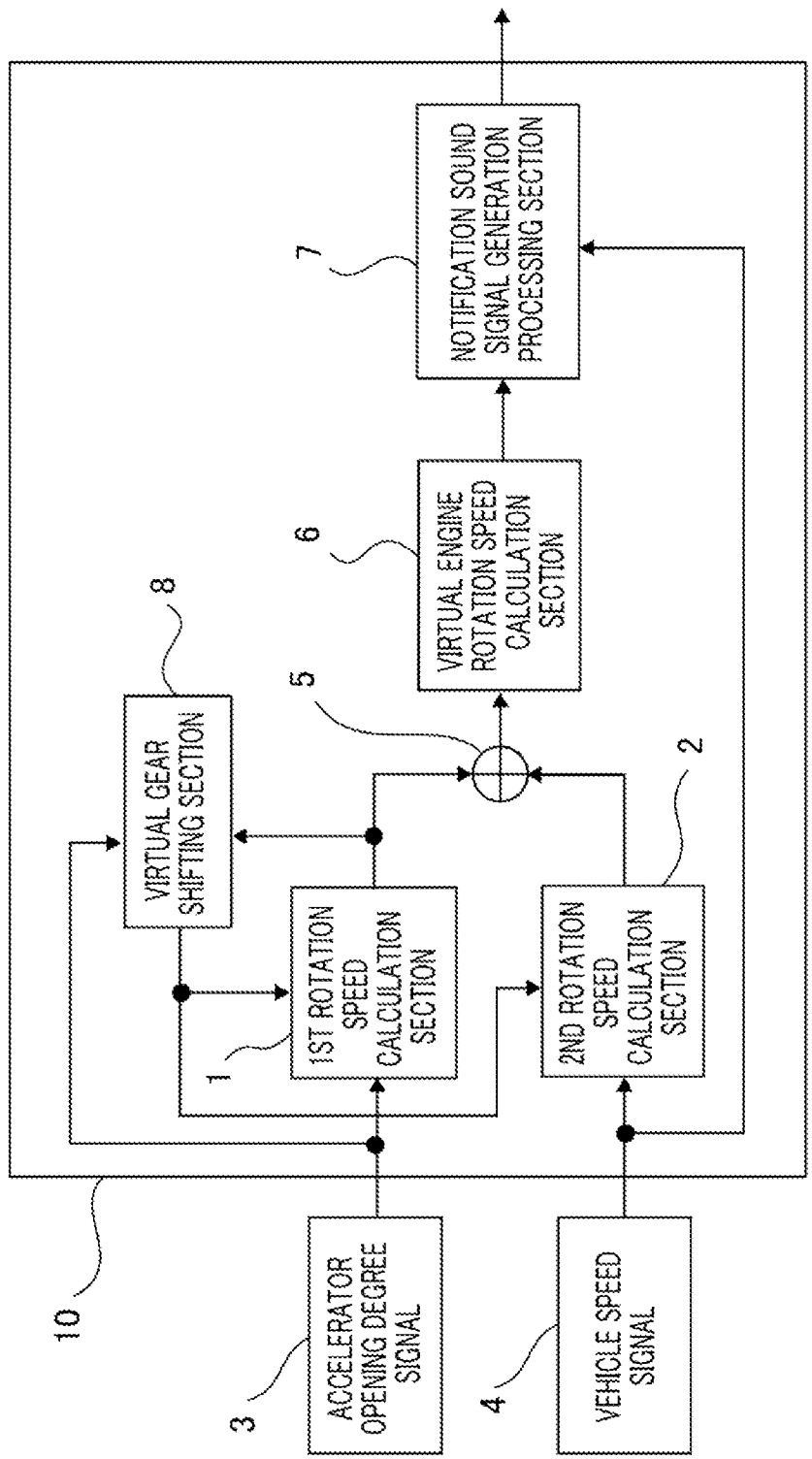
FIG. 16 is a block diagram representing another configuration of the notification sound control unit of the approaching vehicle audible system according to Embodiment 2 of the present invention.

FIG. 16 is a block diagram representing another configuration of the notification sound control unit of the approaching vehicle audible system according to Embodiment 2 of the present invention. The virtual gear shifting section 8 in the configuration represented in FIG. 16 receives the value of the first rotation speed calculated based on the accelerator opening degree signal 3 in the first rotation speed calculation section 1, determines a gear value in accordance with the value of the first rotation speed, and then notifies the first rotation speed calculation section 1 and the second rotation speed calculation section 2 of variable parameters in accordance with the gear value.

That is to say, as is the case with the configuration in FIG. 14, the virtual gear shifting section 8 shifts the gear value upward in the case where the rotation speed calculated by the first rotation speed calculation section 1 exceeds a threshold value, and shifts the gear value downward in the case where the rotation speed is smaller than the threshold value. Based on the changed gear value, the virtual gear shifting section 8 notifies the first rotation speed calculation section 1 of the minimum value and the maximum value of the rotation speed (i.e. R(MIN) and R(MAX) in the equation (1)) and notifies the second rotation speed calculation section 2 of the weight coefficient a and the transmission ratio N in the equation (2).

Figure 17:
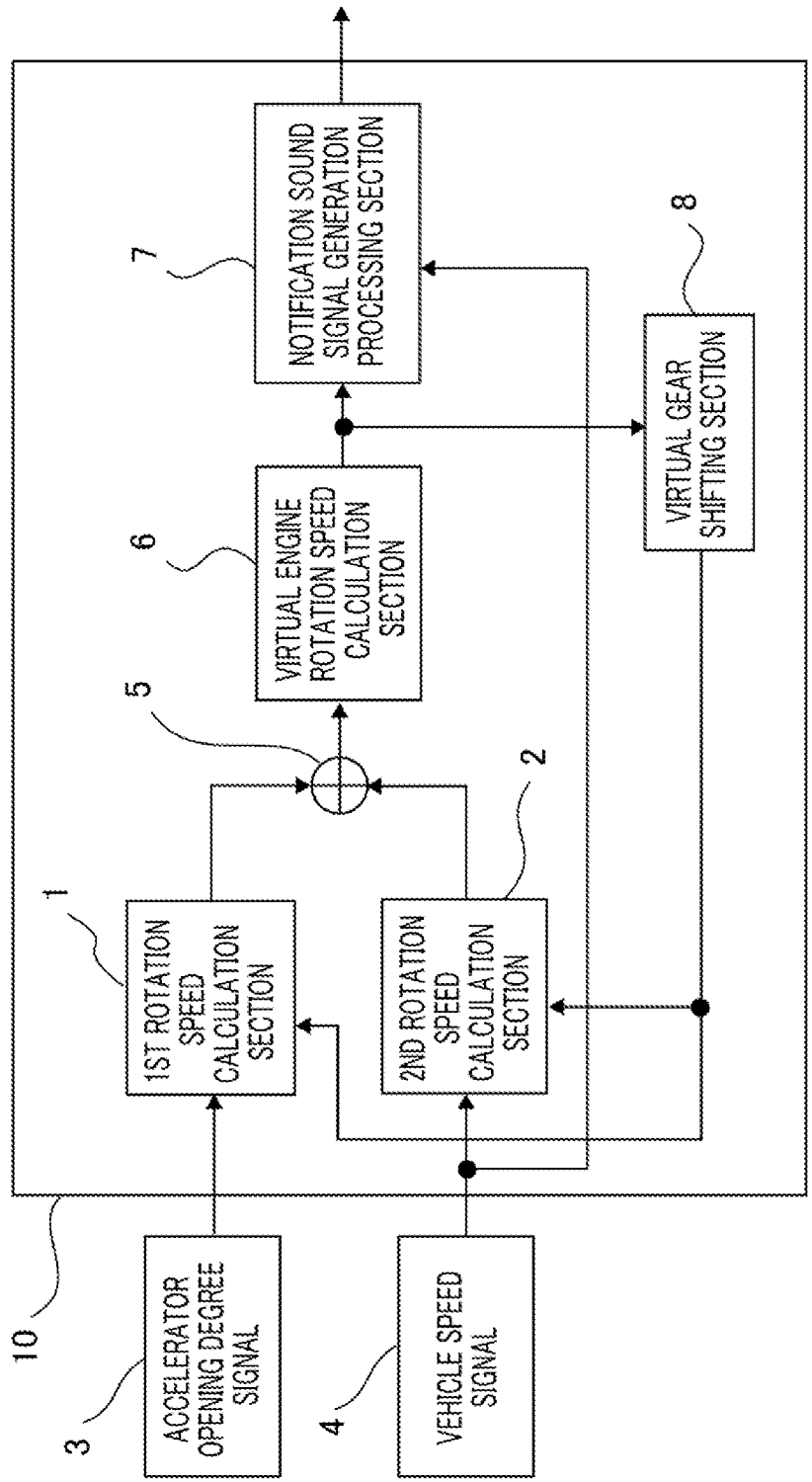
FIG. 17 is a block diagram representing further another configuration of the notification sound control unit of the approaching vehicle audible system according to Embodiment 2 of the present invention.

FIG. 17 is a block diagram representing further another configuration of the notification sound control unit of the approaching vehicle audible system according to Embodiment 2 of the present invention. The virtual gear shifting section 8 in the configuration represented in FIG. 17 receives the value of the virtual engine rotation speed calculated in the virtual engine rotation speed calculation section 6, determines a gear value in accordance with the virtual engine rotation speed, and then notifies the first rotation speed calculation section 1 and the second rotation speed calculation section 2 of variable parameters in accordance with the gear value.

That is to say, the virtual gear shifting section 8 shifts the gear value upward in the case where the rotation speed calculated by the virtual engine rotation speed calculation section 6 exceeds a threshold value, and shifts the gear value downward in the case where the rotation speed is small than the threshold value. Based on the changed gear value, the virtual gear shifting section 8 notifies the first rotation speed calculation section 1 of the minimum value and the maximum value of the rotation speed (i.e., R(MIN) and R(MAX) in the equation (1)) and notifies the second rotation speed calculation section 2 of the weight coefficient a and the transmission ratio N in the equation (2).

The rotation speed synthesis section 5 may change the synthesis proportion in accordance with the gear value determined by the virtual gear shifting section 8. FIG. 18 represents an example in which the synthesis proportion is changed in accordance with the gear value. The proportion of the second rotation speed based on the vehicle speed is made larger as the gear value, i.e., the transmission ratio becomes larger, so that it is made possible to make the rotation speed closer to the engine rotation speed of a conventional engine automobile; thus, a more natural notification sound can be produced.

As described above, when the virtual gear shifting section 8 is provided, is made to change the virtual rotation speed in a wide range for a wide range of vehicle behavior, as is the case with an MT (transmission) vehicle or an AT (automatic) vehicle equipped with a conventional gasoline engine. In addition, when the virtual gear shifting section 8 changes the gear value, the calculated engine rotation speed has discontinuity, in general; therefore, the feeling of discomfort occurs in the notification sound. However, by use of the filtering processing by the virtual engine rotation speed calculation section 6, in which the inertia of a vehicle is simulated, the rotation-speed change in accordance with the gear value can also be smoothly simulated. As a result, a more natural transition of a sound at a time when the gear is changed can be reproduced by simple processing.

Embodiment 3

FIG. 19 is a block diagram representing the basic configuration of a notification sound signal generation processing section in a notification sound control unit of an approaching vehicle audible system according to Embodiment 3 of the present invention. In Embodiment 3, the notification sound signal generation processing section 7 has three sound elements 710, i.e., a sound element 1, a sound element 2, and a sound element 3, as the sources of a notification sound. The signals of the sound elements are pitch-converted in respective pitch conversion sections 720 and volume-converted in respective volume conversion sections 730. In the present embodiment, the respective pitch conversion sections and volume conversion sections determine conversion coefficients in accordance with the value of a virtual engine rotation speed calculated by the virtual engine rotation speed calculation section 6, and then convert the signals of the sound elements.

A sound element synthesis section 75 synthesizes the converted sound signals at a predetermined synthesis proportion. The synthesis proportion of the sound element synthesis section 75 may be a fixed value; the synthesis proportion may be changed based on, for example, vehicle information items such as the vehicle speed and the accelerator opening degree. The reason why the notification sound signal generation processing section 7 has a plurality of sound elements is that the respective pitches and volumes of the sound elements are separately controlled so that the deviation of a notification sound, which, in the case of a single sound element, is liable to deviate toward a high-frequency range because pitch thereof is unnecessarily raised, is eliminated. For example, while the pitch of one sound element is raised as the virtual engine rotation speed becomes higher, the pitch of another sound element is raised less or is held constantly, so that it is made possible to output a notification sound having a frequency band ranging up to a low frequency band, regardless of the virtual engine rotation speed.

Moreover, a volume conversion section D 76 obtains the vehicle speed signal 4 and changes the volume in accordance with the vehicle ed. In the case where the notification sound is muted when the vehicle speed exceeds a given speed, this can also be utilized as a muting function; alternatively, utilizing the fact that as the vehicle speed rises, the road noise becomes larger, this can also be utilized for gradually reducing the volume of the notification sound as the vehicle speed rises.

In the scope of the present invention, the embodiments thereof can be combined with one another and can appropriately be modified or omitted.

DESCRIPTION OF REFERENCE NUMERALS

1: 1st rotation speed calculation section
2: 2nd rotation speed calculation section
3: accelerator opening degree signal
4: vehicle speed signal
5: rotation speed synthesis section
6: virtual engine rotation speed calculation section
7: notification sound signal generation processing section
8: virtual gear shifting section
10: notification sound control unit
40: sounding device
71, 710: sound element
72, 720: pitch conversion section
73, 730: volume conversion section
75: sound signal synthesis section
100: approaching vehicle audible system
200: electric vehicle

The invention claimed is:

1. A notification sound control nit of an approaching vehicle audible system, generating a signal for a notification sound to be emitted from a sounding device provided in an electric vehicle in which at least part of driving force is produced by an electric motor to the outside of the electric vehicle, the notification sound control unit of an approaching vehicle audible system comprising:
   a first rotation speed calculation section that calculates a rotation speed, based on an accelerator opening degree signal among vehicle information signals of the electric vehicle;
   a second rotation speed calculation section that calculates a rotation speed, based on a vehicle speed signal among vehicle information signals of the electric vehicle;
   a rotation speed synthesis section that synthesizes a first rotation speed calculated by the first rotation speed calculation section and a second rotation speed calculated by the second rotation speed calculation section;
   a virtual engine rotation speed calculation section that applies filtering processing to a synthesis rotation speed synthesized by the rotation speed synthesis section so as to calculate a virtual engine rotation speed; and
   a notification sound signal generation processing section that changes a pitch and a volume of a sound element signal outputted from a sound element, based on the virtual engine rotation speed, so as to generate a notification sound signal.

2. The notification sound control unit of an approaching vehicle audible system according to claim 1, wherein the filtering processing the virtual engine rotation speed calculation section is filtering processing utilizing a predetermined approximation equation.

3. The notification sound control unit of an approaching vehicle audible system according to claim 2, wherein the filtering processing in the virtual engine rotation speed calculation section is filtering processing utilizing a feedback filter.

4. The notification sound control unit of an approaching vehicle audible system according to claim 2, wherein the filtering processing in the virtual engine rotation speed calculation section is filtering processing utilizing a non-feedback filter.

5. The notification sound control, unit of an approaching vehicle audible system according to claim 2, wherein the filtering processing in the virtual engine rotation speed calculation section is filtering processing utilizing a moving average.

6. The notification sound control unit of an approaching vehicle audible system according to claim 1, further including a virtual gear shifting section, wherein the virtual gear shifting section obtains a virtual gear value, based on any one of the first rotation speed, the second rotation speed, and the virtual engine rotation speed and then updates the corresponding rotation speed out of the first rotation speed, the second rotation speed, and the virtual engine rotation speed, based on the obtained virtual gear value.

7. The notification sound control unit of an approaching vehicle audible system according to claim 1, wherein a synthesis proportion in the rotation speed synthesis section is determined based on the accelerator opening degree signal and the vehicle speed signal.

8. The notification sound control unit of an approaching vehicle audible system according to claim 1, wherein a synthesis proportion in the rotation speed synthesis section is determined based on the rotation speed and the second rotation speed.

9. The notification sound control unit of an approaching vehicle audible system according to claim 1, wherein the synthesis proportion in the rotation speed synthesis section is a predetermined synthesis proportion.

* * * * *